US011197327B2

(12) United States Patent
Tsuchihashi

(10) Patent No.: US 11,197,327 B2
(45) Date of Patent: Dec. 7, 2021

(54) COMMUNICATION APPARATUS, CONTROL METHOD FOR COMMUNICATION APPARATUS, AND RECORDING MEDIUM

(71) Applicant: CANON KABUSHIKI KAISHA, Tokyo (JP)

(72) Inventor: Masakazu Tsuchihashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 16/714,537

(22) Filed: Dec. 13, 2019

(65) Prior Publication Data

US 2020/0214053 A1 Jul. 2, 2020

(30) Foreign Application Priority Data

Dec. 27, 2018 (JP) ............................ JP2018-246037

(51) Int. Cl.

*H04W 76/10* (2018.01)
*H04L 29/08* (2006.01)
*H04W 72/10* (2009.01)
*H04W 84/12* (2009.01)

(52) U.S. Cl.

CPC ............ *H04W 76/10* (2018.02); *H04L 67/02* (2013.01); *H04L 67/36* (2013.01); *H04W 72/10* (2013.01); *H04W 84/12* (2013.01)

(58) Field of Classification Search

None

See application file for complete search history.

(56) References Cited

U.S. PATENT DOCUMENTS

| | | | | |
|---|---|---|---|---|
| 11,089,134 B1 * | 8/2021 | Gordon | H04L 67/36 | |
| 2013/0174237 A1 * | 7/2013 | Zises | H04L 63/08 | 726/7 |
| 2014/0140296 A1 * | 5/2014 | Choi | H04L 5/0055 | 370/329 |
| 2014/0164582 A1 * | 6/2014 | Dawson | H04W 48/18 | 709/221 |
| 2015/0208455 A1 * | 7/2015 | Yen | H04W 76/14 | 370/329 |
| 2016/0269534 A1 * | 9/2016 | Roldan | H04M 15/8033 | |

(Continued)

FOREIGN PATENT DOCUMENTS

JP 2013-162322 A 8/2013

*Primary Examiner* — Otis L Thompson, Jr.
(74) *Attorney, Agent, or Firm* — Canon U.S.A., Inc. I.P. Division

(57) ABSTRACT

A communication apparatus includes a communication unit, an operation unit, a generation unit including a first function for generating a connection setting used for connecting with the external apparatus based on information received from the external apparatus, and a second function for generating the connection setting based on information input by the user operating the operation unit, a recording control unit configured to perform control such that the connection setting generated by the first function is recorded on a recording medium in a state where a priority level of the connection setting generated by the first function is higher than a priority level of the connection setting generated by the second function, and a control unit configured to perform control such that the connection setting of a higher priority level is preferentially used during a connection with the external apparatus through the communication unit.

10 Claims, 9 Drawing Sheets

(56) References Cited

U.S. PATENT DOCUMENTS

| | | | | |
|---|---|---|---|---|
| 2017/0208134 | A1* | 7/2017 | Grauch | H04L 41/0681 |
| 2017/0324817 | A1* | 11/2017 | Oliveira | H04L 67/10 |
| 2018/0032997 | A1* | 2/2018 | Gordon | G06Q 30/0269 |

* cited by examiner

FIG.3

| | API | method/request | response | EXPLANATION |
|---|---|---|---|---|
| 301 | http://xxx/<br>deviceinfo | GET | {“productname”:“device”,<br>“serialnumber”: “000000000000”,<br>“macaddress”: “aa:bb:cc:dd:ee:ff”,<br>“firmwareversion”: “1.0.0”} | RETURN PRODUCT INFORMATION |
| 302 | http://xxx/<br>wificonnection | POST<br>{“action”:“restart”} | 200 OK | CONTROL CAMERA CONNECTION |
| 303 | http://xxx/<br>wifisettings | GET | {<br>“wifisetting_set1”: {<br>“ssid”: “SSID_SET01”,<br>“method”: “infrastructure”,<br>“channel”: “auto”,<br>“authentication”: “”,<br>“encryption”: “aes”,<br>“keyindex”: “”,<br>“password”: “xxxxxxxx”,<br>“ipaddressset”: “auto”,<br>“ipaddress”: “”<br>“subnetmask”: “”,<br>“gateway”: “”<br>},<br>“wifisetting_set2”: {<br>...<br>},<br>“wifisetting_set3”: {<br>...<br>}<br>} | RETURN CONNECTION SETTING LIST |
| 304 | http://xxx/<br>wifisettings/set1 | GET | {<br>“ssid”: “SSID_SET01”,<br>“method”: “infrastructure”,<br>“channel”: “auto”,<br>“authentication”: “”,<br>“encryption”: “aes”,<br>“keyindex”: “”,<br>“password”: “xxxxxxxx”,<br>“ipaddressset”: “auto”,<br>“ipaddress”: “”<br>“subnetmask”: “”,<br>“gateway”: “”<br>} | RETURN CONNECTION SETTING set1 |
| | | DELETE | 200 OK | DELETE CONNECTION SETTING set1 |
| | | PUT<br>{<br>“ssid”: “SSID_AP”,<br>“method”: “infrastructure”,<br>“channel”: “auto”,<br>“authentication”: “open”,<br>“encryption”: “none”,<br>“keyindex”: “”<br>“password”: “”,<br>“ipaddressset”: “manual”,<br>“ipaddress”: “192.168.1.2”,<br>“subnetmask”: “255.255.255.0”,<br>“gateway”: “192.168.1.1”<br>} | 200 OK<br>{<br>“ssid”: “SSID_AP”,<br>“method”: “infrastructure”,<br>“channel”: “auto”,<br>“authentication”: “open”,<br>“encryption”: “none”,<br>“keyindex”: “”<br>“password”: “”,<br>“ipaddressset”: “manual”,<br>“ipaddress”: “192.168.1.2”,<br>“subnetmask”: “255.255.255.0”,<br>“gateway”: “192.168.1.1”<br>} | OVERWRITE CONNECTION SETTING set1 |
| | | | : | |

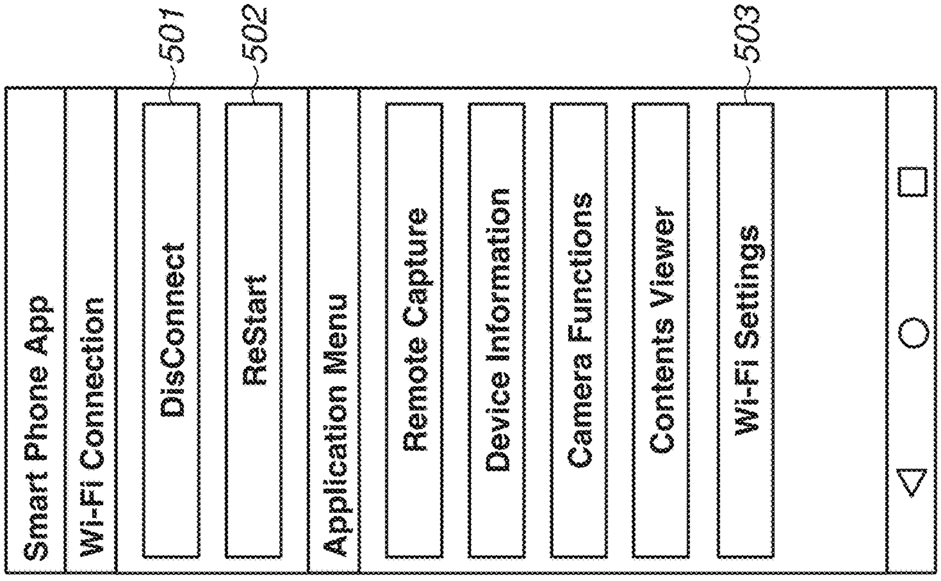

FIG.5A

Smart Phone App

Wi-Fi Connection

- DisConnect — 501
- ReStart — 502

Application Menu

- Remote Capture
- Device Information
- Camera Functions
- Contents Viewer
- Wi-Fi Settings — 503

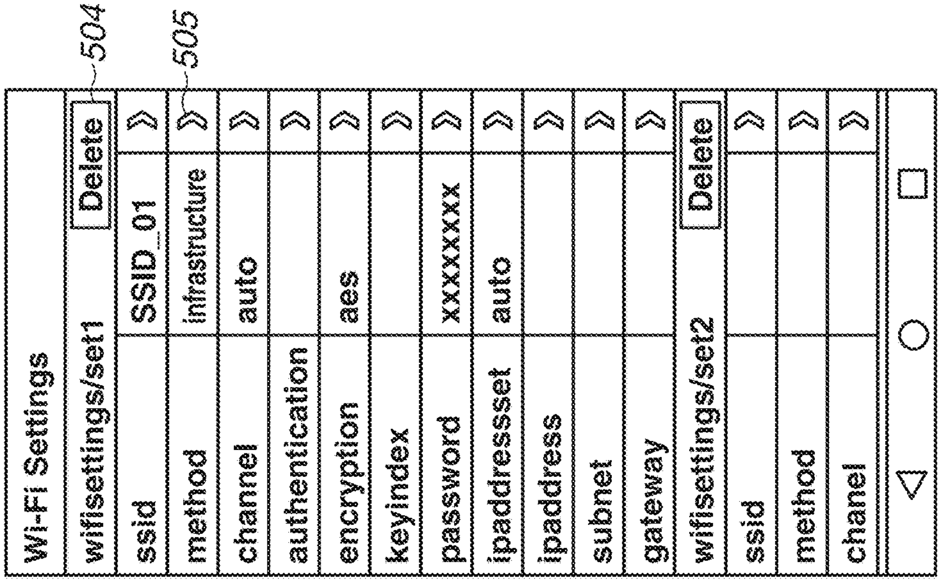

FIG.5B

Wi-Fi Settings

| wifisettings/set1 | | Delete — 504 |
|---|---|---|
| ssid | SSID_01 | » — 505 |
| method | infrastructure | » |
| channel | auto | » |
| authentication | | » |
| encryption | aes | » |
| keyindex | | » |
| password | xxxxxxxx | » |
| ipaddressset | auto | » |
| ipaddress | | » |
| subnet | | » |
| gateway | | » |
| wifisettings/set2 | | Delete |
| ssid | | » |
| method | | » |
| chanel | | » |

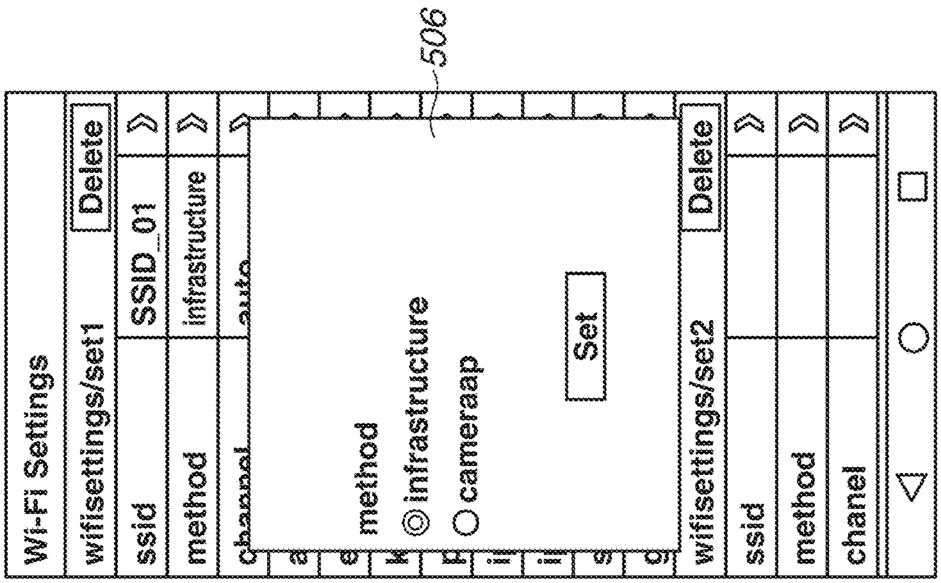

FIG.5C

Wi-Fi Settings

| wifisettings/set1 | | Delete |
|---|---|---|
| ssid | SSID_01 | » |
| method | infrastructure | » |

method
◉ infrastructure
○ cameraap

[ Set ]

— 506

| wifisettings/set2 | | Delete |
|---|---|---|
| ssid | | » |
| method | | » |
| chanel | | » |

COMMUNICATION APPARATUS, CONTROL METHOD FOR COMMUNICATION APPARATUS, AND RECORDING MEDIUM

BACKGROUND

Field

The present disclosure relates to a communication apparatus capable of communicating with an external apparatus.

Description of the Related Art

In recent years, an increasing number of electronic devices, such as personal computers, digital cameras, game machines, tablet terminals, and mobile telephones have been equipped with a camera function and a communication function, and data transmission and reception between these electronic devices has been achieved. Under the current situation where communication can be established among a large number of devices, a plurality of settings for a connection among electronic devices can often be stored. In such cases, there is a need to determine which of the connection settings is to be used to establish a connection among the electronic devices. For example, Japanese Patent Application Laid-Open No. 2013-162322 discusses a technique for searching surrounding wireless networks and preferentially displaying networks associated with a partner device.

In addition, in the method discussed in Japanese Patent Application Laid-Open No. 2013-162322, if a plurality of connection settings as described above can be stored, a higher priority level is set to the last-used connection setting, to thereby enhance usability.

SUMMARY

According to various embodiments of the present disclosure, a communication apparatus includes a communication unit configured to communicate with an external apparatus, an operation unit configured to receive an operation from a user, a generation unit including a first function for generating a connection setting used for connecting with the external apparatus based on information received from the external apparatus through the communication unit, and a second function for generating the connection setting based on information input by the user operating the operation unit, a recording control unit configured to perform control such that the connection setting generated by the first function to be recorded on a recording medium in a state where a priority level of the connection setting generated by the first function is higher than a priority level of the connection setting generated by the second function, and a control unit configured to perform control such that the connection setting of a higher priority level is preferentially used during a connection with the external apparatus through the communication unit.

Further features will become apparent from the following description of exemplary embodiments with reference to the attached drawings.

BRIEF DESCRIPTION OF THE DRAWINGS

FIG. 3 illustrates examples of application programming interfaces (APIs) provided by a transmission device according to the first exemplary embodiment.

FIGS. 5A, 5B, and 5C each illustrate a UI used during generation of a connection setting for a reception device according to the first exemplary embodiment.

DESCRIPTION OF THE EMBODIMENTS

Exemplary embodiments will be described in detail below with reference to the accompanying drawings.

Each of the exemplary embodiments described below is an example of implementing features of the present disclosure, and can appropriately be modified or altered based on a configuration and various conditions of an apparatus to which features of the present disclosure are applied. The following exemplary embodiments can be combined as needed.

<Internal Configuration of Digital Camera 100>

Figure 1:
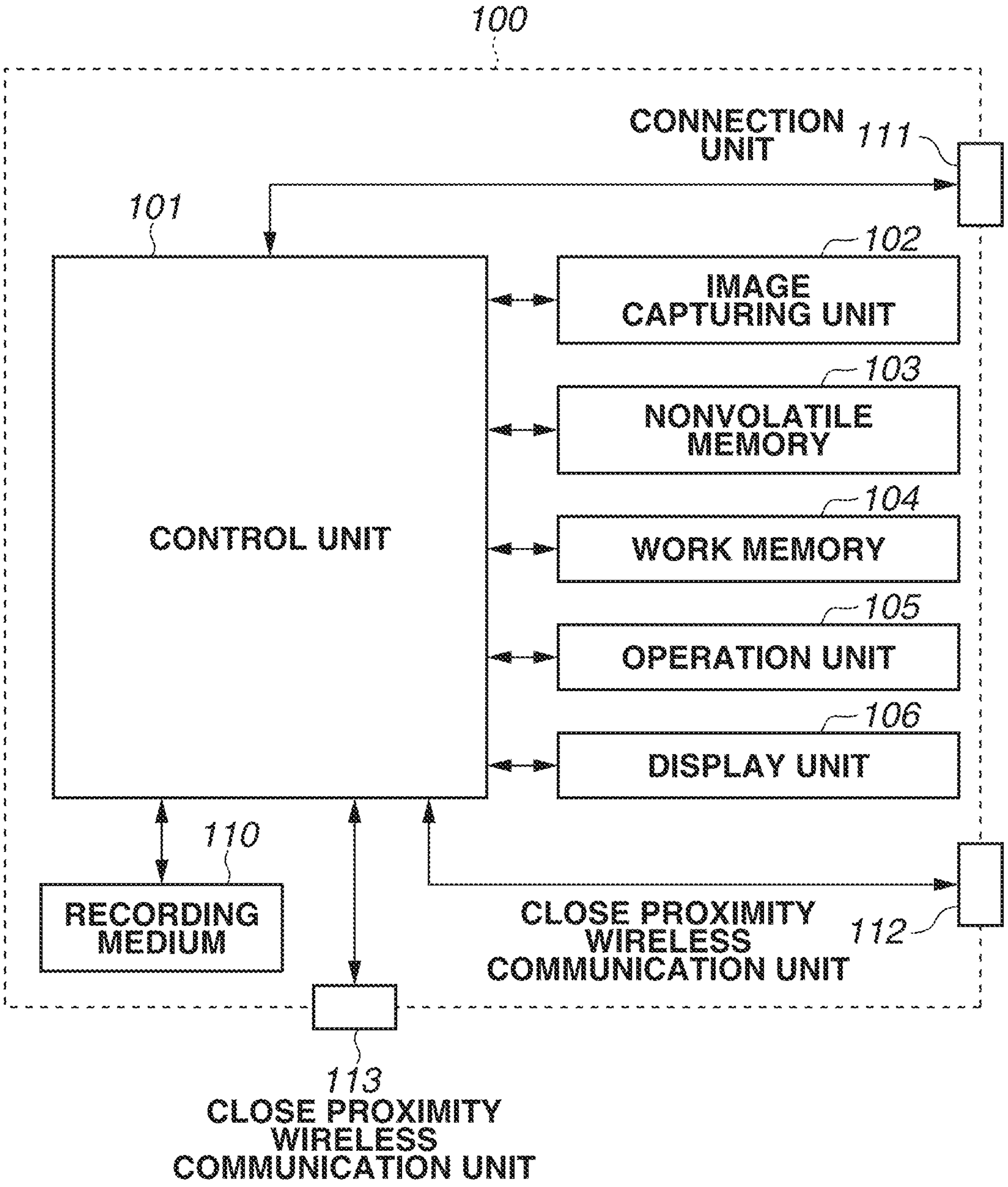
FIG. 1 is a block diagram illustrating a configuration example of a digital camera according to a first exemplary embodiment.

A first exemplary embodiment will be described below. FIG. 1 is a block diagram illustrating a configuration example of a digital camera 100 which is an example of a communication apparatus according to the first exemplary embodiment. The first exemplary embodiment illustrates a digital camera as an example of the communication apparatus. However, the communication apparatus is not limited to the example. Examples of the communication apparatus may include a portable media player and information processing apparatus such as a so-called tablet device and a personal computer.

A control unit 101 controls each unit of the digital camera 100 based on input signals and programs to be described below. Instead of employing a configuration in which the control unit 101 controls the overall operation of the apparatus, the overall operation of the apparatus may be controlled by sharing processing among a plurality of pieces of hardware.

An image capturing unit 102 is composed of, for example, an optical lens unit, an optical system that controls a diaphragm, zooming, focusing, and the like, and an image sensor for converting light (video image) introduced through the optical lens unit into an electrical video signal. A complementary metal oxide semiconductor (CMOS) image sensor or a charge-coupled device (CCD) image sensor is generally used as the image sensor. The control unit 101 controls image capturing unit 102 such that object light focused by a lens included in the image capturing unit 102 is converted into an electrical signal by the image sensor and digital data is obtained by performing noise reduction processing or the like and is output as image data. In the digital camera 100 according to the present exemplary embodiment, the image data is recorded on a recording medium 110 in accordance with a Design rule for Camera File system (DCF) standard.

A nonvolatile memory 103 is an electrically erasable/recordable nonvolatile memory. A program to be executed by the control unit 101 as described below and the like are stored in the nonvolatile memory 103.

A work memory 104 is used as a buffer memory that temporarily holds image data obtained by the image capturing unit 102, an image display memory for a display unit 106, a work area for the control unit 101, or the like.

An operation unit 105 is used to receive a user's instruction for the digital camera 100 from the user. Examples of the operation unit 105 include a power supply button used by the user to instruct ON/OFF of a power supply of the digital camera 100, a release switch used for instructing image capturing, and a reproduction button used for instructing reproduction of image data. Examples of the operation unit 105 also include operation members such as a dedicated connection button used for starting communication with an external device via a connection unit 111 to be described below. Examples of the operation unit 105 also include a touch panel formed on the display unit 106 to be described below. The release switch includes SW1 and SW2. When the release switch is in a half-pressed state, the SW1 is turned on. According to an ON state of the SW1, an instruction for preparing image capturing, such as autofocus (AF) processing, automatic exposure (AE) processing, automatic white balance (AWB) processing, or flash preliminary emission (EF) processing, is received. When the release switch enters a so-called fully-pressed state, the SW2 is turned on. According to an ON state of the SW2, an instruction for performing image capturing is received.

The display unit 106 produces, for example, display of a viewfinder image during image capturing, display of captured image data, and display of characters for an interactive operation. The display unit 106 does not necessarily needs to be incorporated in the digital camera 100. The digital camera 100 only needs to be connectable to the internal or external display unit 106, and may include at least a display control function for controlling display of the display unit 106.

The recording medium 110 can record the image data output from the image capturing unit 102. The recording medium 110 may be detachably attached to the digital camera 100, or may be incorporated in the digital camera 100. In other words, the digital camera 100 may include at least a unit that accesses the recording medium 110 to control recording.

The connection unit 111 is an interface for connecting with an external apparatus. The digital camera 100 according to the present exemplary embodiment can exchange data with the external apparatus via the connection unit 111. For example, image data generated by the image capturing unit 102 can be transmitted to the external apparatus via the connection unit 111. In the present exemplary embodiment, the connection unit 111 includes an interface for communicating with the external apparatus via a so-called wireless local area network (LAN) in accordance with an Institute of Electrical and Electronics Engineers (IEEE) 802.11 standard. The control unit 101 controls the connection unit 111 to thereby implement wireless communication with the external apparatus. The communication method to be used in the present exemplary embodiment is not limited to a wireless LAN, but instead may include an infrared communication method. The connection unit 111 is an example of a first wireless communication unit.

A close proximity wireless communication unit 112 is composed of, for example, an antenna for wireless communication, a modulation/demodulation circuit for processing a wireless signal, and a communication controller. The close proximity wireless communication unit 112 outputs a modulated wireless signal from the antenna, or demodulates a wireless signal received by the antenna, thereby implementing near field wireless communication in accordance with an IEEE 802.15 standard (so-called Bluetooth®). In the present exemplary embodiment, Bluetooth® communication adopts Bluetooth® Low Energy version 4.0 with lower power consumption. This Bluetooth® communication has a narrower communicable range (i.e., a communicable distance is shorter) than wireless LAN communication. The communication speed of Bluetooth® communication is lower than the communication speed of wireless LAN communication. On the other hand, power consumption in Bluetooth® communication is less than power consumption in wireless LAN communication. The digital camera 100 according to the present exemplary embodiment can exchange data with the external apparatus via the close proximity wireless communication unit 112. For example, when an image capturing instruction is received from the external apparatus, the image capturing unit 102 is controlled to perform an image capturing operation, and when an instruction for communicating data by wireless LAN communication is received, the connection unit 111 is controlled to start wireless LAN communication.

A close proximity wireless communication unit 113 is composed of, for example, an antenna for wireless communication, a modulation/demodulation circuit for processing a wireless signal, and a communication controller. The close proximity wireless communication unit 113 outputs a modulated wireless signal from the antenna, or demodulates a wireless signal received by the antenna, thereby implementing contactless close proximity communication. In this case, for example, contactless close proximity communication conforming to an International Organization for Standardization (ISO)/International Electrotechnical Commission (IEC) 18092 standard (so-called Near Field Communication (NFC)) is implemented. The close proximity wireless communication unit 113 according to the present exemplary embodiment is disposed on a side of the digital camera 100.

The digital camera 100 is connected to the external apparatus by bringing the respective close proximity wireless communication units of the digital camera 100 into close proximity to the external apparatus to start communication. In the case of connecting the digital camera 100 to the external apparatus by using the close proximity wireless communication units, the close proximity wireless communication units do not necessarily need to be brought into contact with each other. The close proximity wireless communication units can communicate with each other even when the close proximity wireless communication units are separated from each other by a certain distance. Accordingly, in order to connect the digital camera 100 to the external apparatus, it is sufficient to bring the close proximity wireless communication units close to each other in a range where close proximity wireless communication can be established. In the following description, bringing the close proximity wireless communication units close to each other in a range where close proximity wireless communication can be established is also referred to as bringing the close proximity wireless communication units into close proximity.

Communication is not started if the respective close proximity wireless communication units are in a range where close proximity wireless communication cannot be established. Even in a case where the respective close proximity wireless communication units are in a range where close proximity wireless communication can be established and a communication connection is established between the digital cameras 100 and the external apparatus, if the respective close proximity wireless communication units come to be separated from each other and are in a range where close proximity wireless communication cannot be established, the communication connection is released. The contactless close proximity communication implemented by the close proximity wireless communication unit 113 is not limited to NFC, and another wireless communication may be adopted. For example, contactless close proximity communication conforming to an ISO/IEC 14443 standard may be adopted as the contactless close proximity communication to be implemented by the close proximity wireless communication unit 113.

In the present exemplary embodiment, the communication speed of the communication implemented by the connection unit 111 is higher than the communication speed of the communication implemented by the close proximity wireless communication unit 113 to be described below. The communication implemented by the connection unit 111 has a wider communicable range than the communication implemented by the close proximity wireless communication unit 113. Instead, the communication implemented by the close proximity wireless communication unit 113 can limit a communication partner due to the narrowness of the communicable range, and thus does not require processing, such as exchanging an encryption key, which is used for the communication to be implemented by the connection unit 111. In other words, communication can be more easily performed than by using the connection unit 111.

The connection unit 111 of the digital camera 100 according to the present exemplary embodiment includes an AP mode in which the connection unit 111 operates as an access point in an infrastructure mode, and a CL mode in which the connection unit 111 operates as a client in the infrastructure mode. By causing the connection unit 111 to operate in the CL mode, the digital camera 100 according to the present exemplary embodiment can operate as a CL device in the infrastructure mode. When the digital camera 100 operates as the CL device, the digital camera 100 can participate in a network formed by an AP device by connecting to a peripheral AP device. By causing the connection unit 111 to operate in the AP mode, the digital camera 100 according to the present exemplary embodiment can operate as a simplified AP (hereinafter referred to as a "simple AP"), which is one type of AP but has more limited functions. When the digital camera 100 operates as the simple AP, the digital camera 100 forms a network by itself. Surrounding apparatuses of the digital camera 100 recognize the digital camera 100 as the AP device, and can participate in the network formed by the digital camera 100. A program for causing the digital camera 100 to operate in the above-described manner is held in the nonvolatile memory 103.

The digital camera 100 according to the present exemplary embodiment is one type of AP, but is the simple AP that does not include a gateway function for transferring data received from the CL device to an Internet service provider or the like. Therefore, even when the digital camera 100 receives data from another apparatus participating in the network formed by the digital camera 100, the digital camera 100 cannot transfer the data to a network such as the Internet.

The digital camera 100 according to the present exemplary embodiment has been described above.

<Internal Configuration of Smartphone 200>

Figure 2:
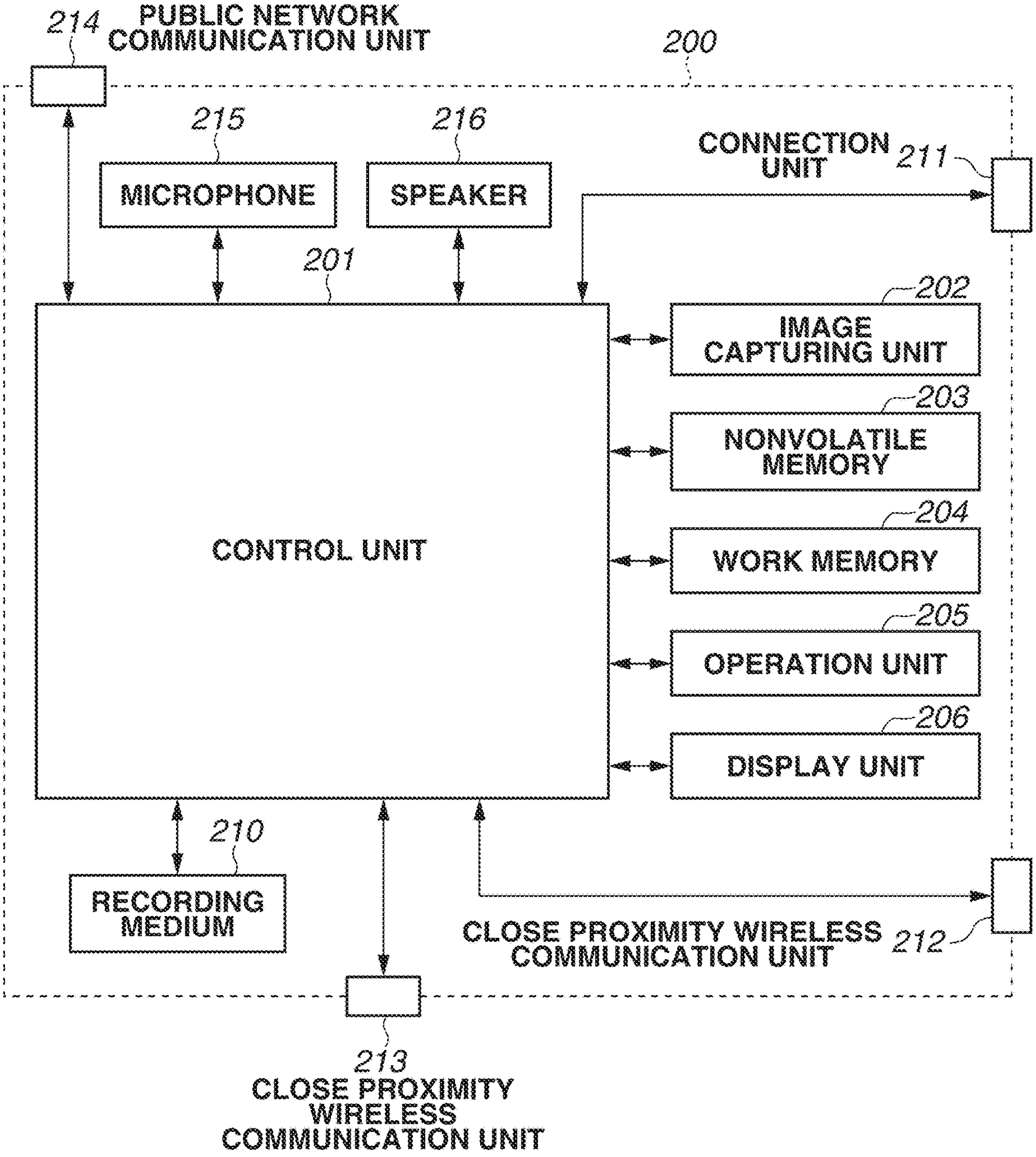
FIG. 2 is a block diagram illustrating a configuration example of a smartphone according to the first exemplary embodiment.

FIG. 2 is a block diagram illustrating a configuration example of a smartphone 200 which is an example of the communication apparatus according to the present exemplary embodiment. While the present exemplary embodiment illustrates a smartphone as an example of the communication apparatus, the communication apparatus is not limited to the example. Examples of the communication apparatus may include a portable media player and information processing apparatus such as a so-called tablet device and a personal computer.

A control unit 201, an image capturing unit 202, a nonvolatile memory 203, a work memory 204, an operation unit 205, a display unit 206, a recording medium 210, a connection unit 211, a close proximity wireless communication unit 212, and a close proximity wireless communication unit 213 of the smartphone 200 are respectively similar to the control unit 101, the image capturing unit 102, the nonvolatile memory 103, the work memory 104, the operation unit 105, the display unit 106, the recording medium 110, the connection unit 111, the close proximity wireless communication unit 112, and the close proximity wireless communication unit 113 of the digital camera 100, and thus the descriptions thereof are omitted.

A public network communication unit 214 is an interface used for public wireless communication. The smartphone 200 has a call function for making a call to another device via the public network communication unit 214. In this case, the control unit 201 inputs and outputs an audio signal through a microphone 215 and a speaker 216, thereby implementing the call function. In the present exemplary embodiment, the public network communication unit 214 is an antenna and the control unit 201 can connect to a public network via the antenna. The connection unit 211 and the public network communication unit 214 can share one antenna. The smartphone 200 according to the present exemplary embodiment has been described above.

<Application Programming Interface (API) Configuration for Controlling Digital Camera from External Apparatus>

FIG. 3 illustrates examples of APIs for controlling the digital camera 100 from an external apparatus. The digital camera 100 according to the present exemplary embodiment publishes an available API from the external apparatus such as the smartphone 200. A designer of the external apparatus implements the external apparatus to transmit a request to the digital camera 100 by using the published API, thereby making it possible to control the operation of the digital camera 100 and acquire device information and content data files from the digital camera 100.

The API is preliminarily stored as a program in the nonvolatile memory 103 of the digital camera 100. When communication is established with the external apparatus via the connection unit 111, the control unit 101 loads the API into the work memory 104, and waits until the API is requested from the external apparatus. Upon detecting that the API is requested from the external apparatus, the control unit 101 executes processing depending on the type of the requested API and returns the processing result to the external apparatus as a response. The API is executed on a communication protocol defined by the digital camera 100, and the external apparatus communicates with the digital camera 100 by using the defined communication protocol and sends a request for the API. While the present exemplary embodiment is described assuming that the request for the API and the response are executed using a Hypertext Transfer Protocol (HTTP), the request for the API and the response may be executed using another communication protocol. The HTTP is a known communication protocol, and thus the description thereof is omitted.

The request for the API can be implemented in such a manner that the external apparatus describes an API name and a required argument in an HTTP request body as text, and transmits the HTTP request body to the digital camera 100 by using an HTTP method such as a GET method, a DELETE method, or a POST method. The result of executing the requested API can be returned in such a manner that the control unit 101 returns the result to the external apparatus by adding the result to the HTTP response body.

An API list 300 illustrated in FIG. 3 indicates the type and content of each API provided (published) by the digital camera 100. FIG. 3 illustrates four APIs for convenience of explanation. However, the number of published APIs is not limited to four. FIG. 3 illustrates a case where communication between the digital camera 100 and the smartphone 200 is established by HTTP. The communication can also be established using another communication protocol.

An API 301 (http://xxx/deviceinfo) is an API that enables the external apparatus to acquire product information about the digital camera 100. By the GET method sending a request for this API to the digital camera 100, product information such as a product name, a firmware version, a media access control (MAC) address, and a serial number of the digital camera 100 can be acquired. The product name refers to the product name of the digital camera 100. The firmware version refers to the version number of a program that is stored in the nonvolatile memory 103 and is used to control the digital camera 100. The serial number refers to a unique number with which the individual digital camera 100 can be identified.

An API 302 (http://xxx/wificonnection) is an API for controlling a Wi-Fi connection of the digital camera 100. Examples of a method for controlling the Wi-Fi connection include disconnecting the currently used Wi-Fi connection (disconnect), and disconnecting the currently used Wi-Fi connection to restart connection with a new connection setting (restart). A request for the API together with request data is sent to the digital camera 100 by the POST method. The request data refers to data generated by including data of a JavaScript Object Notation (JSON) format, such as data described in a "method/request" row illustrated in FIG. 3, in a request body. In the JSON format, the entire object is enclosed in "{ }", and a key ("action" in the example illustrated in FIG. 3) and a value ("restart" in the example illustrated in FIG. 3) are represented in the form of "key: value". A client includes in the value the processing to be controlled. The digital camera 100 analyzes the received request body, recognizes the content of the requested control processing, returns "200 OK" as a response, and executes the control processing. No response can be returned after the control processing for the Wi-Fi connection is executed. Accordingly, a response is returned before executing the control processing.

An API 303 (http://xxx/wifisettings) is an API with which a connection setting list stored in the recording medium 110 of the digital camera 100 can be acquired. By sending a request for this API to the digital camera 100 by the GET method, the digital camera 100 collectively returns the stored connection settings as a response. In the example illustrated in FIG. 3, three connection settings ("wifisetting_set1", "wifisetting_set2", and "wifisetting_set3") are returned as a response.

An API 304 (http://xxx/wifisettings/set1) is an API with which one of a plurality of connection settings stored in the recording medium 110 of the digital camera 100 can be controlled. "/set1" indicates an object to be controlled. In this case, "wifisettings_set1" included in the connection setting list acquired by the API 303 is an object to be controlled. By sending a request for this API to the digital camera 100 by the GET method, the digital camera 100 returns only the stored target connection setting as a response. In the case of sending the request by the DELETE method, the digital camera 100 generates an initial value for the connection setting, overwrites the target connection setting, and returns "200 OK" as a response. In the case of sending the request by the POST method, the digital camera 100 generates a connection setting depending on the content of request data, overwrites the target connection setting, and returns "200 OK" as a response. In this case, the digital camera 100 checks whether a bare minimum number of parameters for the requested content are provided, but does not check whether a connection can be established based on the connection setting generated from the request. The content of the generated connection setting will be described below.

The APIs described in the present exemplary embodiment are merely examples of APIs published by the digital camera 100. APIs other than the APIs described in the present exemplary embodiment may be published, or at least one of the APIs described above may not be published.

If a plurality of connection settings as described above can be stored, a higher priority level is set to the last-used connection setting, to thereby enhance usability.

However, using the last-used connection setting in a subsequent connection is not always intended by a user. Therefore, a connection setting different from a connection setting desired by a user may be used, which may cause inconvenience to the user.

<Generation of Connection Setting>

Next, a procedure for generating a connection setting will be described.

FIGS. 4A to 4H each illustrate an example of a setting screen to be displayed on the display unit 106 when the digital camera 100 is directly operated to generate a connection setting. FIGS. 5A to 5C each illustrate an example of a setting screen to be displayed on the display unit 206 when the smartphone 200 is operated to generate a connection setting and the generated connection setting is stored in the digital camera 100. The user operates the digital camera 100 along with the screens illustrated in FIGS. 4A to 4H, thereby making it possible to generate a connection setting. Further, the user operates the smartphone 200 along with the screens illustrated in FIGS. 5A to 5C, thereby making it possible to generate a connection setting.

Figure 6:
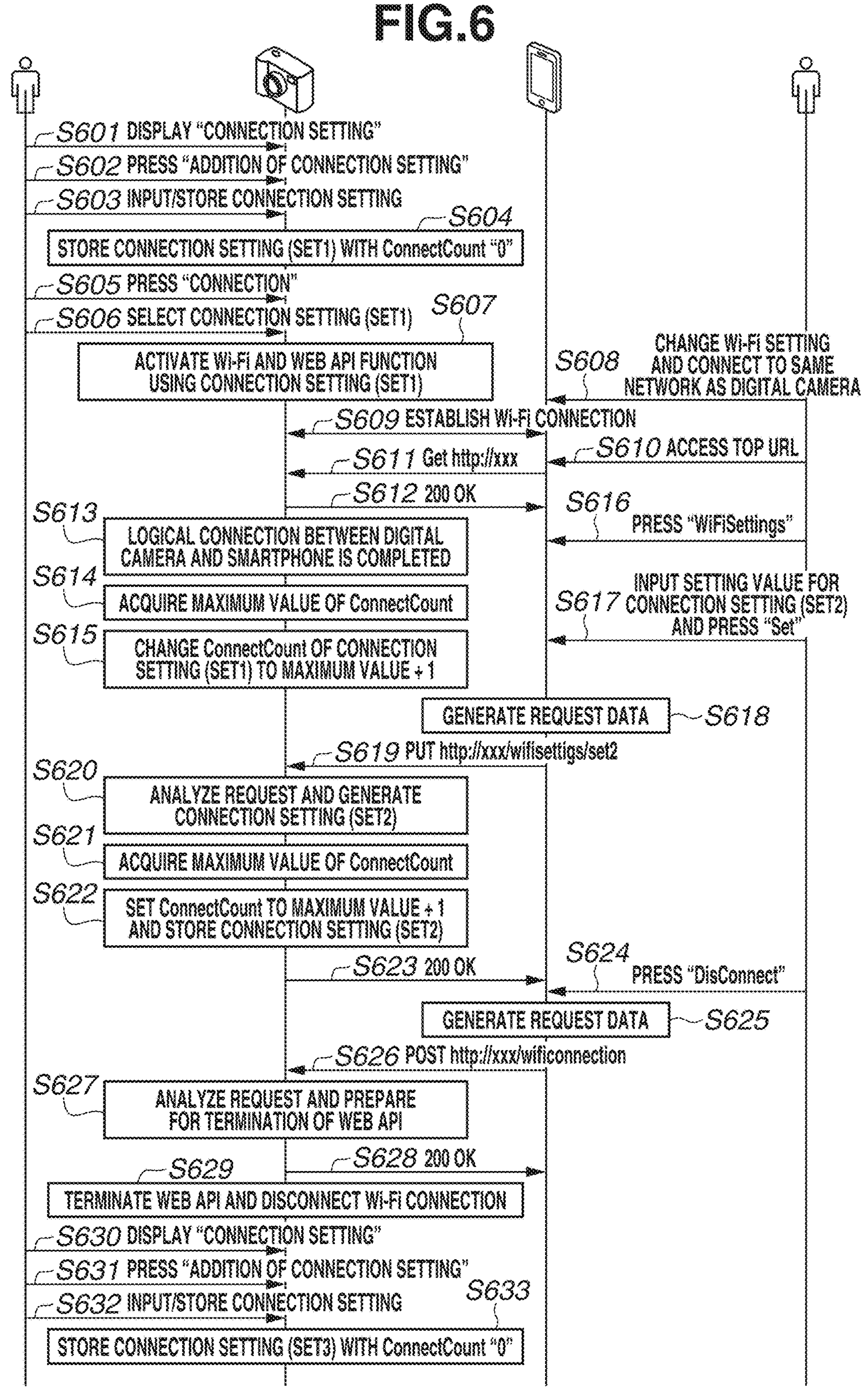
FIG. 6 is a sequence diagram illustrating a processing flow for generating a connection setting according to the first exemplary embodiment.

FIG. 6 is a sequence diagram illustrating a processing flow for generating a connection setting. Processing in the sequence diagram is described by showing an example where the processing is started from a state where no connection setting is stored in the digital camera 100. First, a case where the digital camera 100 is operated to generate a connection setting will be described.

Figure 4A:
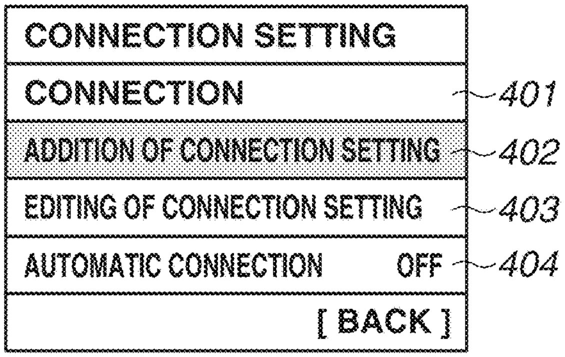
FIGS. 4A to 4H each illustrate a user interface (UI) used during generation of a connection setting for the transmission device according to the first exemplary embodiment.

In step S601, the user operates the operation unit 105 of the digital camera 100 to display a communication menu, and a "connection setting" screen is displayed. For example, a "connection setting" screen illustrated in FIG. 4A is displayed. A "connection" menu 401 is selected when connection processing using the connection setting stored in the digital camera 100 and activation of a web API function are started. The operation unit 105 is operated to select a focus frame by the user, for example, by rotating an electronic dial. In this case, a menu surrounded by the focus frame is selected. The menu may be selected by touching an area in which the menu is displayed on the touch panel. A menu and an OK button described below are also selected in the same manner as described above.

Figure 4B:
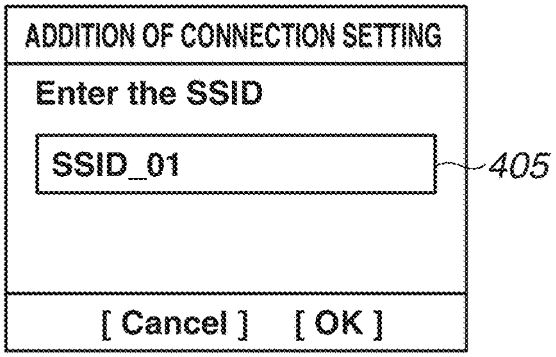
Figure 4C:
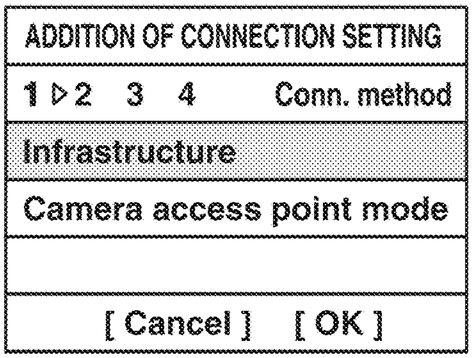
Figure 4D:
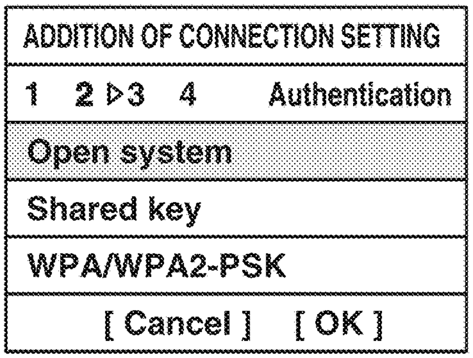
Figure 4E:
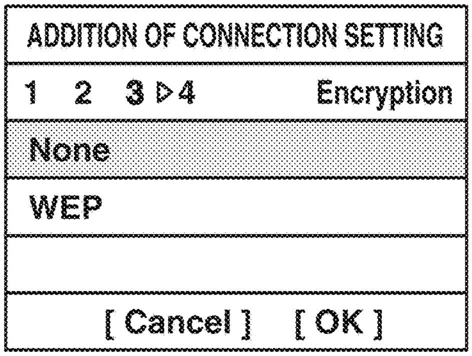
Figure 4F:
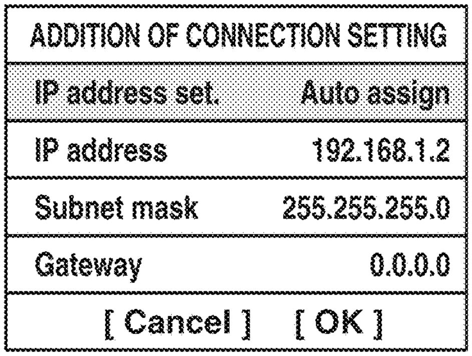
Figure 4G:
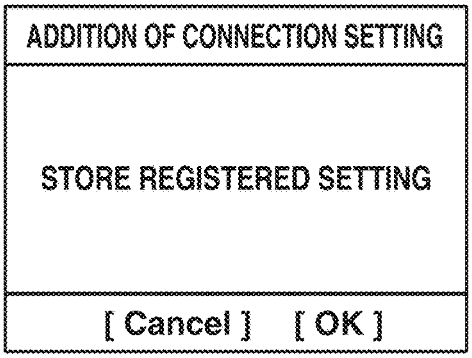
Figure 4H:
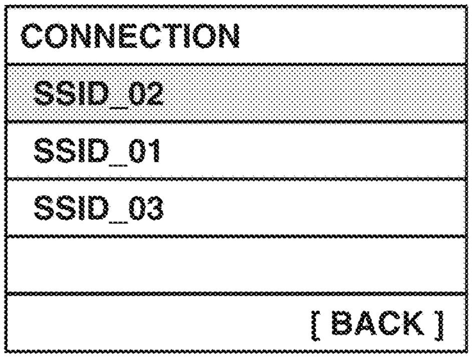

When the "connection" menu 401 is selected on the screen illustrated in FIG. 4A, the screen transitions to a stored connection setting list screen as illustrated in FIG. 4H. The user can select a connection setting to be used from the list.

An "addition of connection setting" menu 402 illustrated in FIG. 4A is used when the digital camera 100 is directly operated to generate a connection setting. When the "addition of connection setting" menu 402 is selected, necessary information is input in accordance with an instruction displayed on the screen, to thereby start processing for generating a connection setting. The user selects setting values that can be set through the connection setting input screens to be sequentially displayed as illustrated in FIGS. 4B to 4G, thereby making it possible to generate a desired connection setting. As illustrated in FIG. 4B, the user inputs a Service Set Identifier (SSID) to be used for connection. When an SSID input frame 405 is selected, a software keyboard is displayed, so that the SSID can be input. When OK is selected in a state where the SSID is input, the screen transitions to the screen illustrated in FIG. 4C. On the screen illustrated in FIG. 4C, a connection method can be selected. When OK is selected in a state where the connection method is selected, the screen transitions to the screen illustrated in FIG. 4D. On the screen illustrated in FIG. 4D, an authentication method can be selected. When OK is selected in a state where the authentication method is selected, the screen transitions to the screen illustrated in FIG. 4E. On the screen illustrated in FIG. 4E, an encryption method can be selected. When OK is selected in a state where the encryption method is selected, the screen transitions to the screen illustrated in FIG. 4F. On the screen illustrated in FIG. 4F, a setting for Transmission Control Protocol/Internet Protocol (TCP/IP) can be input. When OK is selected in a state where the setting for TCP/IP is input, the screen transitions to the screen illustrated in FIG. 4G. On the screen illustrated in FIG. 4G, it is checked whether to store the generated connection setting. When OK is pressed, the connection setting is stored. The connection based on the connection setting generated in this case is not verified. In other words, a trial connection for verifying whether the connection based on the stored setting can be actually established is not executed.

As described above, a connection setting can be generated by inputting necessary information along with the screens to be sequentially displayed.

The stored connection setting can be edited by selecting an "editing of connection setting" menu 403 illustrated in FIG. 4A.

Further, a setting for enabling/disabling an automatic connection function can be input on an "automatic connection" menu 404. The automatic connection function is a function for automatically starting connection processing using a connection setting of a highest priority level among the stored connection settings at power-on of the digital camera 100.

The description of the processing flow is continued by referring back to FIG. 6.

In step S602, the user selects the "addition of connection setting" menu 402 to display an "addition of connection setting" screen as illustrated in FIG. 4B.

In step S603, the user inputs the connection setting as described above along with the screens illustrated in FIGS. 4B to 4G, and stores the generated connection setting.

A data structure for connection settings to be stored in the digital camera 100 in this case will be described.

Figure 7:
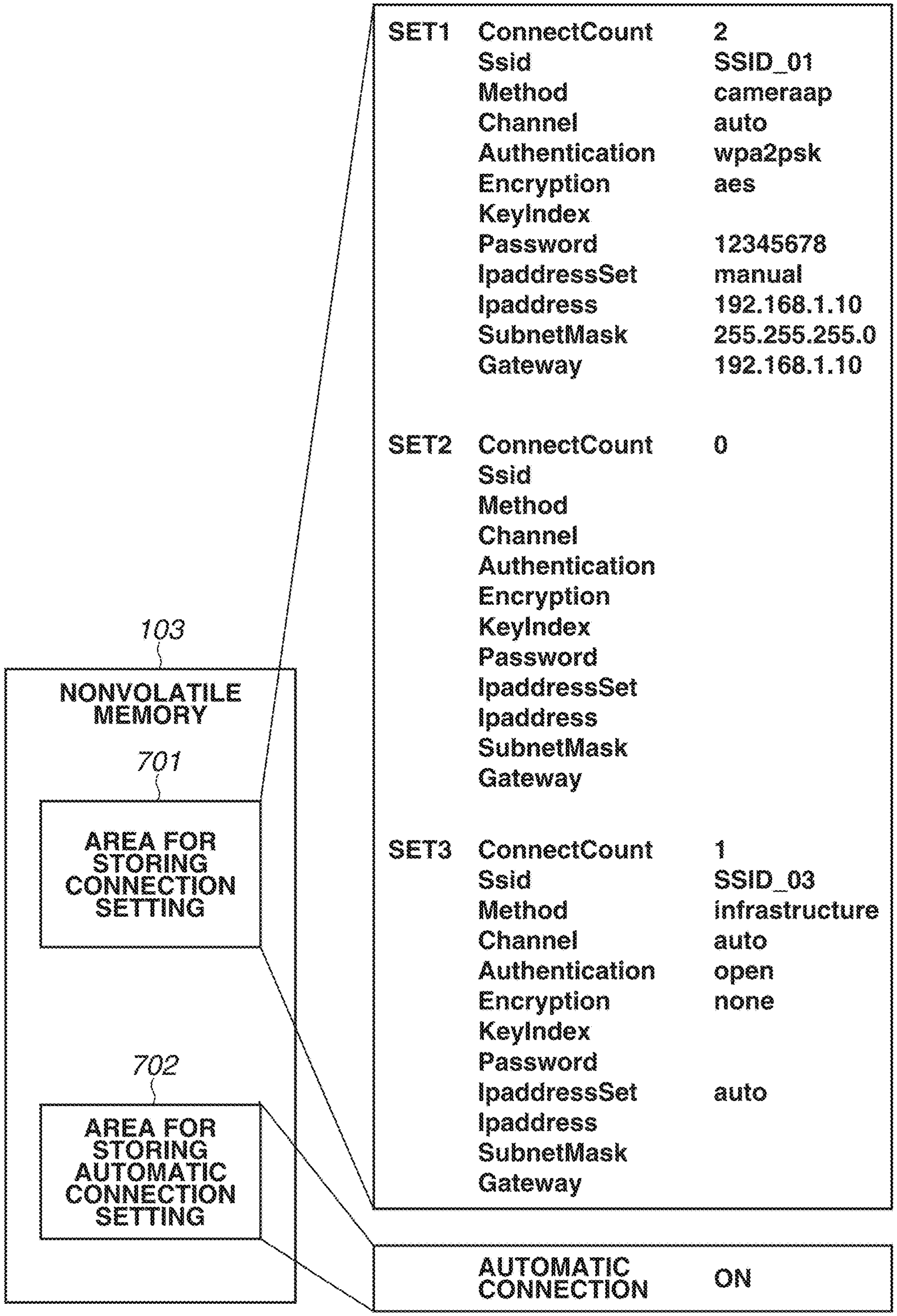
FIG. 7 illustrates a data structure for connection settings according to the first exemplary embodiment.

FIG. 7 illustrates a data structure of connection settings to be stored in the nonvolatile memory 103 of the digital camera 100. An area 701 for storing connection settings is set in the nonvolatile memory 103. Connection settings are stored in the area 701. In an example illustrated in FIG. 7, three connection settings, i.e., SET1, SET2, and SET3, are stored in the area 701. In each of the connection settings, a priority level (ConnectCount) is set in addition to the wireless setting and TCP/IP setting input in FIGS. 4A to 4H. ConnectCount is represented by an integer. The ConnectCounts of the respective connection settings are compared and it is determined that the ConnectCount having a largest value indicates a highest priority level. When a logical connection using the stored connection setting is completed, a value greater than the ConnectCount of the other connection settings is set and stored again upon completion of the logical connection so that the priority level of the connection setting can be increased. Further, if a lower priority level is set for a connection setting to be newly added, the ConnectCount is set to "0" and the connection setting is stored. At the time of the storage, the priority level is automatically set.

It is highly likely that the connection setting based on which a logical connection with a counter device has been successful can be used to establish a subsequent connection. If the connection with the counter device is verified and the connection setting is stored during the connection setting generation processing, or if the logical connection using the stored connection setting is successful, it is highly likely that the subsequent connection can be established, and thus the ConnectCount is set to a highest level. In the case where connection processing is automatically started at the time of power-on of the digital camera 100, the digital camera 100 can be started with the connection setting with which it is most likely that the connection with the counter device can be established by using the connection setting of the highest ConnectCount. On the contrary, in the case of generating a connection setting without verifying the logical connection with the counter device, it is less likely that the subsequent connection with the counter device can be established, and thus the ConnectCount is set to a lowest level. There is a case where the logical connection may not be verified. For example, a connection setting for connecting to a network environment is made in advance before reaching the location where the digital camera 100 is going to be used. The ConnectCount of the connection setting generated as described above is set to the lowest level. As a consequence, when the ConnectCount is set to the lowest level, the connection setting added during the automatic connection processing at the time of power-on is not used, so that wasteful connection processing is prevented from being performed.

The setting for enabling/disabling the automatic connection function described above is stored in an area 702 for storing an automatic connection setting.

The description of the processing flow is continued by referring back to FIG. 6.

In step S604, the control unit 101 stores the connection setting generated by the user as SET1. A location (SET) where the connection setting is stored may be designated by the user, or a location that is not in use may be automatically selected by the digital camera 100. The connection based on the generated connection setting (SET1) is not verified.

Accordingly, the ConnectCount is set to "0" and stored, in consideration of the possibility that the connection cannot be actually established.

By the procedure described above, the connection setting input by the user using the digital camera 100 is stored.

Next, a procedure for actually executing connection processing by using the stored connection setting will be described.

In step S605, the user selects the "connection" menu 401 from the connection setting screen to display a connection setting list screen illustrated in FIG. 4H.

In step S606, the user selects the connection setting (SET1) previously generated.

In step S607, the control unit 101 establishes a Wi-Fi connection using the connection setting (SET1) designated by the user and performs TCP/IP setting, and activates the web API function. The digital camera 100 waits for access from the client (smartphone 200) in a state where the web API function is activated.

In step S608, the user operates the smartphone 200 to connect to the same Wi-Fi network as the digital camera 100.

In step S609, the Wi-Fi connection between the digital camera 100 and the smartphone 200 is established. Upon completion of the Wi-Fi connection, in step S610, the user starts access to the web API function activated by the digital camera 100. The web API function may be accessed using a dedicated application stored in the smartphone 200, or using a web browser. The present exemplary embodiment illustrates a case where a dedicated application is used. When the web API function is accessed, in step S611, a request for an API (URL) prepared by the web API function is made. The digital camera 100 which has received the request performs processing based on the accessed API and returns a response in step S612.

Based on the responses obtained in steps S611 and S612, in step S613, it is determined that the logical connection between the digital camera 100 and the smartphone 200 is completed.

In step S614, a maximum value of the ConnectCount is acquired from the stored connection settings other than the currently used connection setting (SET1).

In step S615, the maximum value+"1" is set as the ConnectCount of the connection setting (SET1), and the connection setting (SET1) is stored. In this case, since connection settings other than the connection setting (SET1) are not stored yet, "1" is set as the ConnectCount of the connection setting (SET1).

By the procedure described above, the connection is actually established using the connection setting input by the user using the digital camera 100. As a result, the connection setting stored in step S604 is stored again in a state where the priority level of the connection setting is higher than that set when the connection setting is stored.

Next, a case where a wireless setting for the digital camera 100 is generated from the smartphone 200 by using a dedicated application for controlling the digital camera 100 will be described.

The dedicated application will now be described. FIGS. 5A to 5C each illustrate an example of a dedicated application screen for controlling the digital camera 100. FIG. 5A illustrates a top screen for the dedicated application. When an operation button, which is arranged on the screen, is selected, APIs prepared in the digital camera 100 are called and executed. An operation button 501 corresponds to the API 302 and is used to post a request with a value indicating "DisConnect". In response to the request, the digital camera 100 disconnects the Wi-Fi connection. An operation button 502 corresponds to the API 302 and is used to post a request with a value indicating "restart". In response to the request, the digital camera 100 disconnects the Wi-Fi connection and reestablishes a connection based on the connection setting of the highest priority level (ConnectCount). When an operation button 503 is selected, the API 303 is executed to acquire the connection settings stored in the digital camera 100, and then the screen transitions to the screen illustrated in FIG. 5B. FIG. 5B illustrates the screen on which the connection settings stored in the digital camera 100 can be displayed and changed. An operation button 504 corresponds to the DELETE method of the API 304. When the operation button 504 is selected, the stored connection setting (SET1) can be initialized. An operation button 505 for displaying a setting value change window is located at the right side of each parameter. FIG. 5C illustrates a state where the setting value change window is displayed. When the operation button 505 is pressed, a change window 506 for the corresponding parameter (method) is displayed. Options for the parameter that can be changed are displayed on the change window 506. When "Set" is selected, the dedicated application generates request data and executes the PUT method of the API 304.

The description of the processing flow is continued by referring back to FIG. 6.

In step S616, the user operates the smartphone 200 to select "Wi-Fi Settings" indicated by the operation button 503 from the dedicated application screen for controlling the digital camera 100.

In step S617, the user inputs setting values for the connection setting (SET2) from the dedicated application screen and presses "Set".

In step S618, the dedicated application generates request data for changing the connection setting based on the setting values input by the user. In step S619, the API 304 prepared in the digital camera 100 is executed.

In step S620, the digital camera 100 analyzes the request from the smartphone 200 and generates the connection setting (SET2) based on the request data. Also, in this case, a trial connection is not executed, like in step S604.

In step S621, the maximum value of the ConnectCount is acquired from the stored connection settings other than the connection setting (SET2) generated this time.

In step S622, the maximum value+"1" is set as the ConnectCount of the connection setting (SET2), and the connection setting (SET2) is stored. In this case, the maximum value of the ConnectCount is "1", which is set in the connection setting (SET1). Accordingly, "1" is added to the maximum value and "2" is set as the ConnectCount of the connection setting (SET2). As a result, the priority level of the connection setting (SET2) generated from the API is set to be higher than that of the connection setting (SET1) stored in step S615 and is used for the last connection. Thus, the connection setting (SET2) stored through the operation from the smartphone 200 via the API is set to a priority level higher than that of the actually used connection setting (SET1), although the actual connection is not established like in step S604. This configuration is employed for the following reason. In a connection setting which is remotely input from the smartphone 200, the digital camera 100 may not be located near the user. Accordingly, if the priority level of the connection setting is set to be lower than the priority level of the connection setting (SET1), for example, when the digital camera 100 is restarted by the API 302 in a state where the automatic connection function is ON, the automatic connection function using the connection setting (SET1) is executed. It is highly likely that this operation is not performed along a user's intention when the connection setting (SET2) is stored through the operation from the smartphone 200 via the API, and thus the connection may not be established. Therefore, in the case of storing a connection setting by a remote operation via the API, the digital camera 100 according to the present exemplary embodiment sets the priority level of the connection setting to be higher than that of the connection setting based on which the connection is actually established. Consequently, the operation can be performed along the user's intention.

Lastly, in step S623, the digital camera 100 returns a response to the smartphone 200, and terminates the processing of generating the connection setting from the API.

Next, processing for disconnecting the Wi-Fi connection by the API will be described.

In step S624, the user presses the operation button 501 "DisConnect" from the dedicated application screen.

In step S625, the dedicated application generates a request, and in step S626, the dedicated application executes the API 302 prepared in the digital camera 100.

In step S627, the digital camera 100 analyzes the request from the smartphone 200 and prepares for termination of the web API function.

In step S628, the digital camera 100 returns a response to the smartphone 200, and in step S629, the digital camera 100 performs web API function termination processing and disconnects the Wi-Fi connection. In the processing of disconnecting the Wi-Fi connection by the API, the priority level of the connection setting is not changed.

Next, processing for generating a connection setting by directly operating the digital camera 100 again will be described.

Like in steps S601 to S603 described above, in steps S603 to S632, the user generates a connection setting along with the "connection setting" screen.

In step S633, like in step S604, the control unit 101 stores the connection setting generated by the user as the connection setting (SET3) in a free space of a storage area. The connection based on the generated connection setting (SET3) is not verified, and thus the priority level "ConnectCount" is set to "0" and the connection setting is stored.

The ConnectCount of each connection setting stored by the above-described operation is set as follows. The connection setting (SET1) that has been used for the last connection processing is "1", the connection setting (SET2) generated from the API during connection processing is "2", and the connection setting (SET3) that is generated by directly operating the digital camera 100 and has not been used for connection processing is "0". Thus, it can be recognized that the connection setting (SET2) generated from the API has a high priority level, and the connection setting (SET3) that is generated by directly operating the digital camera 100 and has not been used for connection processing has a low priority level.

<Operation of Digital Camera 100>

Figure 8:
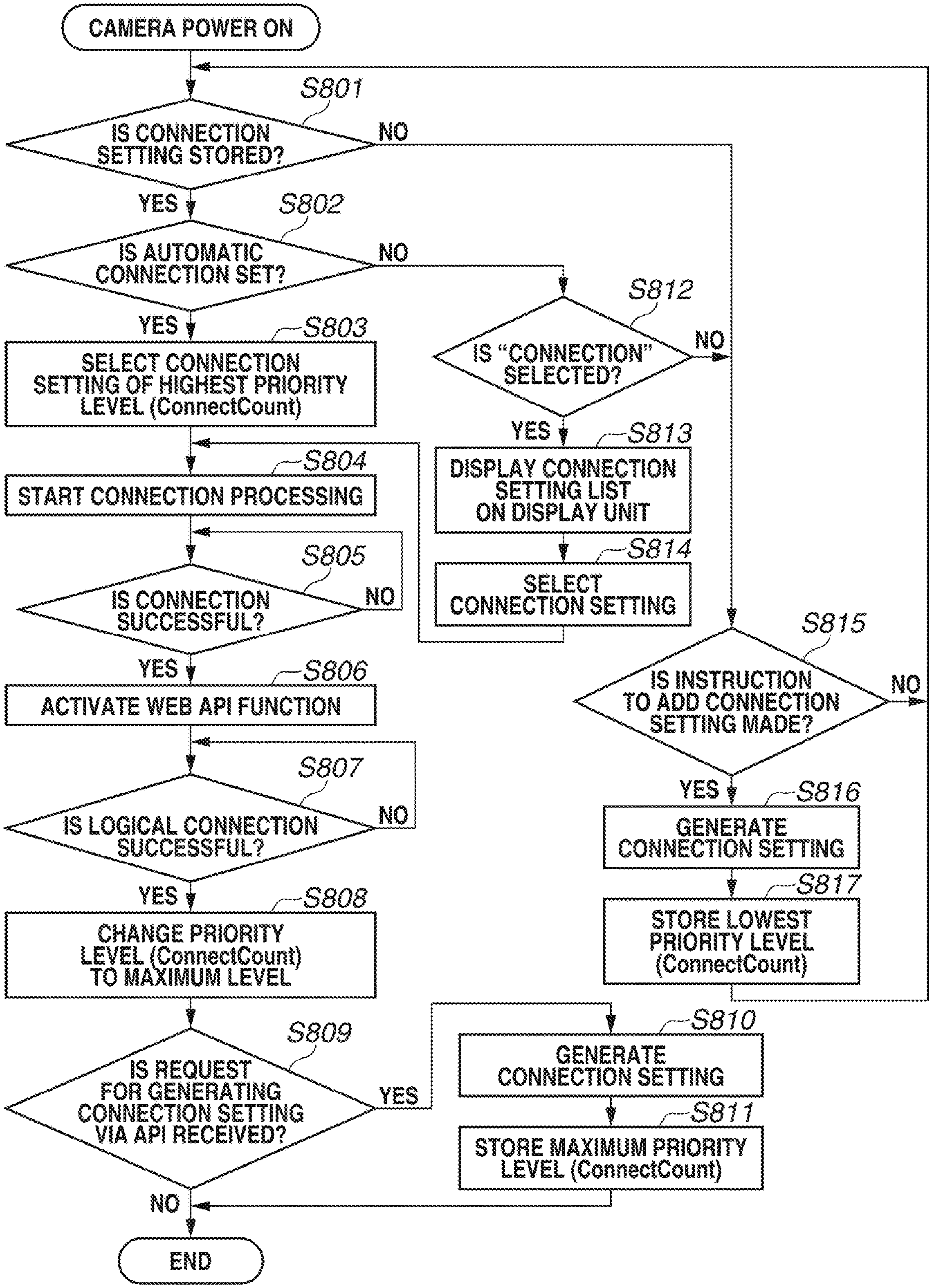
FIG. 8 is a flowchart illustrating an operation of the transmission device according to the first exemplary embodiment.

FIG. 8 is a flowchart illustrating an operation of the digital camera 100 according to the present exemplary embodiment. Processing illustrated in the flowchart is implemented in such a manner that the control unit 101 of the digital camera 100 controls each unit of the digital camera 100 based on input signals and programs. The flowchart is started when the power supply of the digital camera 100 is turned on.

First, an automatic connection processing flow to be started at the time of power-on will be described.

In step S801, the control unit 101 checks whether a connection setting is stored in the area 701 for storing connection settings. If no connection setting is stored (NO in step S801), the processing proceeds to step S815. If a connection setting is stored (YES in step S801), the processing proceeds to step S802.

A case where a connection setting is stored will now be described.

In step S802, the control unit 101 checks the area 702 for storing the automatic connection setting. If the automatic connection is set (YES in step S802), the processing proceeds to step S803. If the automatic connection is not set (NO in step S802), the processing proceeds to step S812.

In step S803, the control unit 101 checks the priority level (ConnectCount) of the connection setting stored in the area 701 for storing connection settings, and selects the connection setting of the highest priority level.

In step S804, the control unit 101 starts connection processing based on the selected connection setting.

In step S805, the control unit 101 checks whether the connection processing is successful. If the connection processing is successful (YES in step S805), the processing proceeds to step S806. If the connection processing is not successful (NO in step S805), the connection processing is repeated. In this case, a threshold may be set to a processing time, and the connection processing may be terminated as timeout if the connection is not successfully established within the threshold. That is, if the connection is not successfully established after a certain period has lapsed since the connection is started, the processing is terminated.

In step S806, the control unit 101 activates the web API function.

In step S807, the control unit 101 checks whether a logical connection is successful. If the web API function can be accessed from the smartphone 200, it is determined that the logical connection is successful. If the web API function is provided with user authentication such as digest authentication, it may be determined that the logical connection is successful when the authentication has been successful. If the logical connection is successful (YES in step S807), the processing proceeds to step S808. If the logical connection is not successful (NO in step S807), the logical connection is repeatedly checked. In this case, a threshold may be set for a processing time in the logical connection check, and the processing may be terminated as timeout if the logical connection is not successfully established within the threshold.

In step S808, the control unit 101 checks the priority level (ConnectCount) of the connection setting stored in the area 701 for storing connection settings. Then, the control unit 101 stores the priority level "ConnectCount" having a value obtained by adding the maximum priority level "ConnectCount"+"1" as the currently used connection setting. With this configuration, the priority level of the connection setting based on which the last logical connection is established can be increased.

The automatic connection processing flow has been described above.

Next, a connection setting which is remotely input via the API will be described.

After the connection, in step S809, the control unit 101 determines whether a request for generating a connection setting via the API is received. If the request is not received (NO in step S809), the processing is terminated while the connection is maintained. After that, a service to be provided through the connection is executed. On the other hand, if it is determined that the request for generating a connection setting via the API is received (YES in step S809), the processing proceeds to step S810.

In step S810, the control unit 101 generates a connection setting in response to the request. Then, in step S811, the control unit 101 sets the priority level of the connection setting generated in step S810 to the highest level and stores the connection setting. Thus, the connection setting generated by a remote operation has the highest priority level.

Next, a processing flow to be executed when a connection setting is arbitrarily selected by the user will be described.

If it is determined that the automatic connection is not to be performed in step S802, in step S812, the control unit 101 determines whether the "connection" menu 401 is selected by the user on the connection setting screen displayed on the display unit 106. If it is determined that the "connection" menu 401 is not selected (NO in step S812), the processing proceeds to step S815. The processing of step S815 and subsequent steps will be described below. On the other hand, if it is determined that the "connection" menu 401 is selected (YES in step S812), the processing proceeds to step S813.

In step S813, the control unit 101 displays the connection setting list screen on the display unit 106. FIG. 4H illustrates an example of the connection setting list screen. On the connection setting list screen, the connection settings stored in the area 701 for storing connection settings are displayed in descending order of priority level (ConnectCount).

In step S814, the control unit 101 receives the selection of any connection setting in the connection setting list from the user. After that, the processing proceeds to step S804. In step S804, the control unit 101 starts the connection processing based on the selected connection setting. The processing of step S804 and subsequent steps has been described above.

Next, the processing of step S815 and subsequent steps will be described.

In step S815, the control unit 101 determines whether an instruction to add a connection setting has been made by a user operation. If it is determined that the instruction has not been made (NO in step S815), the processing returns to step S801. On the other hand, if it is determined that the instruction has been made (YES in step S815), the processing proceeds to step S816.

In step S816, the control unit 101 receives the user operation in accordance with the procedure on the screens illustrated in FIGS. 4A and 4G, and generates a connection setting.

Then, in step S817, the connection setting is stored at a lowest priority level. After that, the processing returns to step S801.

The processing of step S815 and subsequent steps has been described above.

The processing for the digital camera 100 according to the present exemplary embodiment has been described above with reference to FIG. 8.

The present exemplary embodiment is described assuming that the APIs 301 to 304, which are described above with reference to FIG. 3, are provided as API services. However, the type of API provided by API services is not limited to these examples. For example, an API for achieving a linked operation, such as "remote image capturing" and "making a camera setting", may be provided. A new API can be provided by adding an API program to be executed by the digital camera 100.

As described above, according to the present exemplary embodiment, a priority level is set to each connection setting in an electronic device capable of storing a plurality of connection settings, and the priority level is controlled depending on the method of generating the connection setting. Consequently, the connection setting that allows an operation along a user' intention can be used depending on a use case.

In a case where a connection setting generated by the smartphone 200 (counter device) is stored in the digital camera 100, a higher priority level is set, so that the connection setting can be preferentially selected when the digital camera 100 is restarted. The use of this configuration enables the connection setting in the digital camera 100 to be changed by a remote operation.

According to the first exemplary embodiment, in the case of storing a connection setting generated by the smartphone 200 (counter device) in the digital camera 100, a higher priority level is set to the connection setting, thereby enabling the connection setting in the digital camera 100 to be changed by a remote operation.

However, a connection based on the connection setting generated by the smartphone 200 is not actually verified, and thus it is not guaranteed that the connection is reliably successful. In a case where the digital camera 100 is installed at a location where the digital camera 100 cannot be directly operated, if the connection setting is changed to a setting which does not allow communication with the counter device, the connection cannot be controlled.

A second exemplary embodiment illustrates a restoration method to be used when the connection setting is changed to the setting which does not allow communication with the counter device.

Information indicating whether a logical connection for each connection setting has been successful is stored in the digital camera 100. If the connection or logical connection has not been successful, the processing is varied depending on whether the logical connection has been successful. In the case of a connection setting based on which the logical connection has previously been successful, it is highly likely that the connection with the counter device can be established. Accordingly, the digital camera 100 keeps waiting for a repeated connection or logical connection. In the case of a connection setting based on which the logical connection has not previously been successful, it is less likely that the connection with the counter device can be established, and thus the connection processing is terminated. After completion of the connection processing, a connection setting of a higher priority level is selected and the connection processing is restarted. By repeating the above-described process, the connection setting can finally return to the connection setting which has been used during the communication with the counter device even when the connection cannot be established based on the connection setting stored from the counter device.

<Operation of Digital Camera 100>

Figure 9:
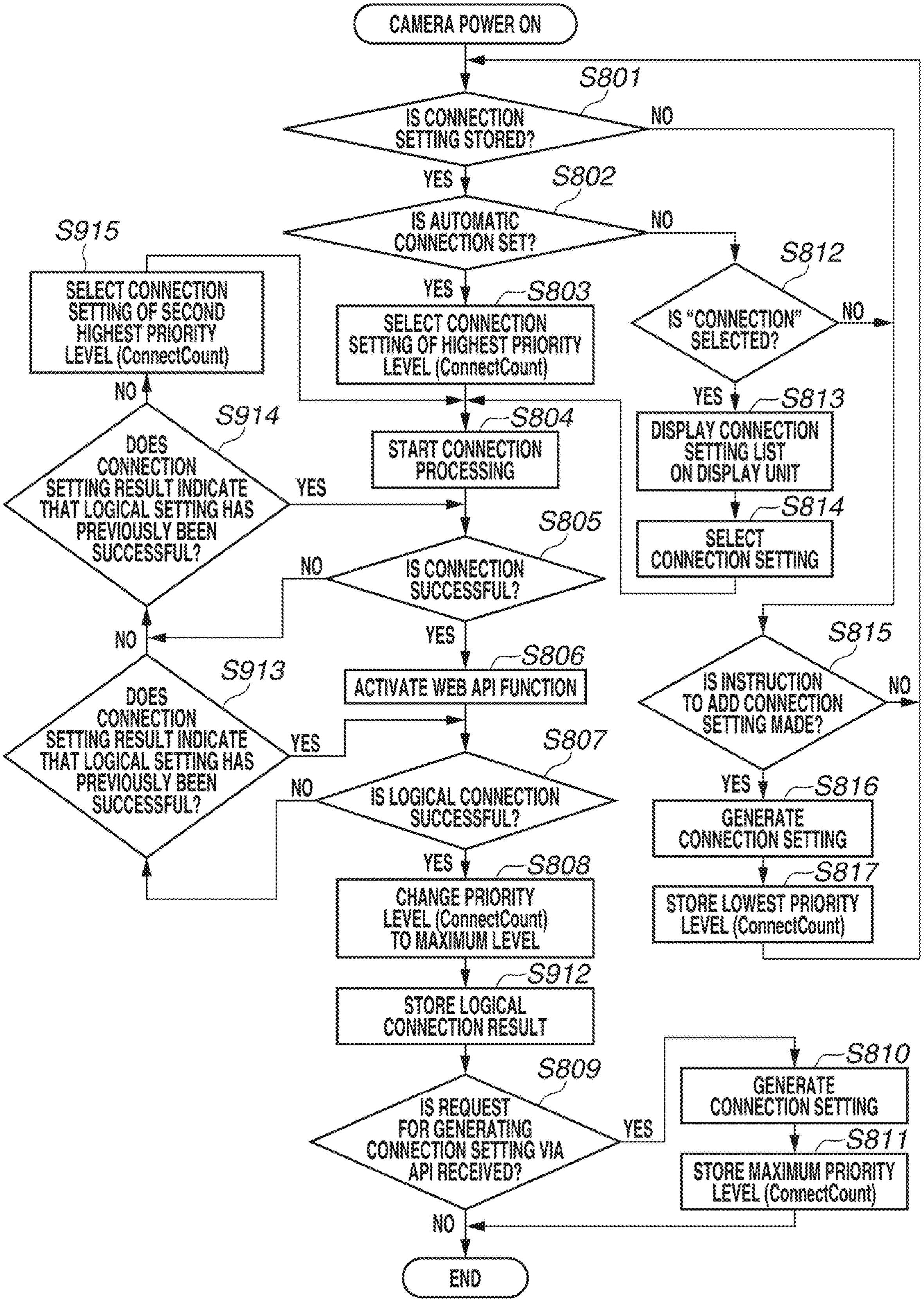
FIG. 9 is a flowchart illustrating an operation of a transmission device according to a second exemplary embodiment.

FIG. 9 is a flowchart illustrating processing for the digital camera 100 according to the present exemplary embodiment. A processing flow illustrated in FIG. 9 starts at the time of power-on of the digital camera 100 and ends when a logical connection with the smartphone 200 is established.

In the flowchart, processes similar to those illustrated in FIG. 8 are denoted by the same reference numbers, and the descriptions thereof are omitted.

In step S808, if the logical connection with the counter device based on the selected connection setting is successful, the processing proceeds to step S912.

In step S912, the control unit 101 stores a logical connection result with respect to the connection setting used for connecting with the counter device. The logical connection result is information indicating whether the logical connection for each connection setting has been successful. At the time that a connection setting is generated, information indicating "logical connection not successful" is stored. When the logical connection is successful at least once, information indicating "logical connection successful" is stored. An area for storing the logical connection result may be provided for each connection setting in the area 701, or another logical connection result storage information area may be prepared in the nonvolatile memory 103. In addition, individual information about the counter device with which the logical connection is established may be stored as the logical connection result from a specific device.

In step S807, if it is not confirmed that the logical connection with the smartphone 200 is successful (NO in step S807), the processing proceeds to step S913.

In step S913, the control unit 101 checks the logical connection result of the connection setting currently used. If the logical connection has previously been successful (YES in step S913), it is highly likely that the connection can be established, and the processing returns to step S807 to wait for access from the smartphone 200. If the logical connection has not previously been successful (NO in step S913), it is less likely that the connection can be established, and the processing proceeds to step S915.

In step S915, the control unit 101 terminates the connection processing once, checks the priority level (ConnectCount) of each connection setting stored in the area 701 for storing connection settings, and selects a connection setting of a second highest priority level next to the previously used connection setting. After the connection setting is selected, the processing proceeds to step S804 to repeat start of the connection processing. In step S915, if there is no connection setting of a second highest priority level, or if the priority level of the subsequently selected connection setting is less than or equal to a threshold, the processing may be terminated.

In step S805, even when it cannot be confirmed that the connection is successful, the processing proceeds to step S914 to perform processing similar to step S913.

While exemplary embodiments have been described, the disclosure is not limited to these specific exemplary embodiments and variations are also included within the scope of the present disclosure.

Other Embodiments

The present disclosure can also be implemented by the processing in which a program for carrying out one or more functions according to the exemplary embodiments described above is supplied to a system or apparatus via a network or a storage medium, and one or more processors in a computer of the system or apparatus read out and execute the program. The present disclosure can also be implemented by a circuit (e.g., an application specific integrated circuit (ASIC)) for implementing one or more functions according to the exemplary embodiments described above.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-246037, filed Dec. 27, 2018, which is hereby incorporated by reference herein in its entirety.

What is claimed is:

1. A communication apparatus comprising:

a communication unit configured to communicate with an external apparatus;

an operation unit configured to receive an operation from a user;

a generation unit including a first function for generating a connection setting used for connecting with the external apparatus based on information received from the external apparatus through the communication unit, and a second function for generating the connection setting based on information input by the user operating the operation unit;

a recording control unit configured to perform control such that the connection setting generated by the first function is recorded on a recording medium in a state where a priority level of the connection setting generated by the first function is higher than a priority level of the connection setting generated by the second function; and a control unit configured to perform control such that the connection setting of a higher priority level is preferentially used during a connection with the external apparatus through the communication unit.

2. The communication apparatus according to claim 1, wherein the control unit includes an automatic connection function for starting a connection at power-on, and wherein in a case where a connection with the external apparatus is established by the automatic connection function, the control unit controls the connection to be established using the connection setting of a highest priority level.

3. The communication apparatus according to claim 1, further comprising a display control unit configured to control a connection setting list recorded on the recording medium to be displayed, wherein the display control unit causes connection settings to be displayed in an order based on the priority level.

4. The communication apparatus according to claim 1, wherein the recording control unit records, for each connection setting recorded on the recording medium, information indicating whether a logical connection with the external apparatus has previously been successful, and wherein in a case where no connection is established after a certain period has lapsed since connection processing is started and a connection setting used for the connection processing has not previously been successful, the control unit performs control to start the connection processing with a connection setting of a second highest priority level.

5. The communication apparatus according to claim 4, wherein the logical connection with the external apparatus is established via a local area network (LAN), and wherein the logical connection is established using a Hypertext Transfer Protocol (HTTP).

6. The communication apparatus according to claim 1, wherein in a case where a logical connection with the external apparatus is successful, a priority level of a connection setting used for the logical connection is set higher than a priority level of any other connection settings recorded on the recording medium.

7. The communication apparatus according to a claim 6, wherein the logical connection is determined to be successful upon reception of a response to an HTTP request.

8. The communication apparatus according to claim 1, wherein in a case where a connection setting is generated by the first function in a state where a connection setting used when a logical connection with the external apparatus is successful is recorded on the recording medium, a priority level of the connection setting generated by the first function is set higher than a priority level of the connection setting used when the logical connection with the external apparatus is successful.

9. A control method for a communication apparatus comprising a communication unit configured to communicate with an external apparatus, and an operation unit configured to receive an operation from a user, the control method comprising:

generating a connection setting by one of a first function and a second function, the first function being a function for generating a connection setting used for connecting with the external apparatus based on information received from the external apparatus through the communication unit, the second function being a function for generating the connection setting based on information input by the user operating the operation unit;

performing recording control such that the connection setting generated by the first function is recorded on a recording medium in a state where a priority level of the connection setting generated by the first function is higher than a priority level of the connection setting generated by the second function; and performing control such that the connection setting of a higher priority level is preferentially used during a connection with the external apparatus through the communication unit.

10. A non-transitory computer-readable storage medium which stores a program for causing a communication apparatus to execute a method, the communication apparatus comprising a communication unit configured to communicate with an external apparatus, and an operation unit configured to receive an operation from a user, the method comprising:

generating a connection setting by one of a first function and a second function, the first function being a function for generating a connection setting used for connecting with the external apparatus based on information received from the external apparatus through the communication unit, the second function being a function for generating the connection setting based on information input by the user operating the operation unit;

performing recording control such that the connection setting generated by the first function is recorded on a recording medium in a state where a priority level of the connection setting generated by the first function is higher than a priority level of the connection setting generated by the second function; and performing control such that the connection setting of a higher priority level is preferentially used during a connection with the external apparatus through the communication unit.

* * * * *